Aug. 24, 1954     I. B. PENNIMAN     2,687,511

APPARATUS FOR TIMING OF PERIODIC EVENTS

Filed June 26, 1947     2 Sheets-Sheet 1

Inventor
Ira B. Penniman

By Frease and Bishop
Attorneys

Aug. 24, 1954  I. B. PENNIMAN  2,687,511
APPARATUS FOR TIMING OF PERIODIC EVENTS
Filed June 26, 1947  2 Sheets-Sheet 2
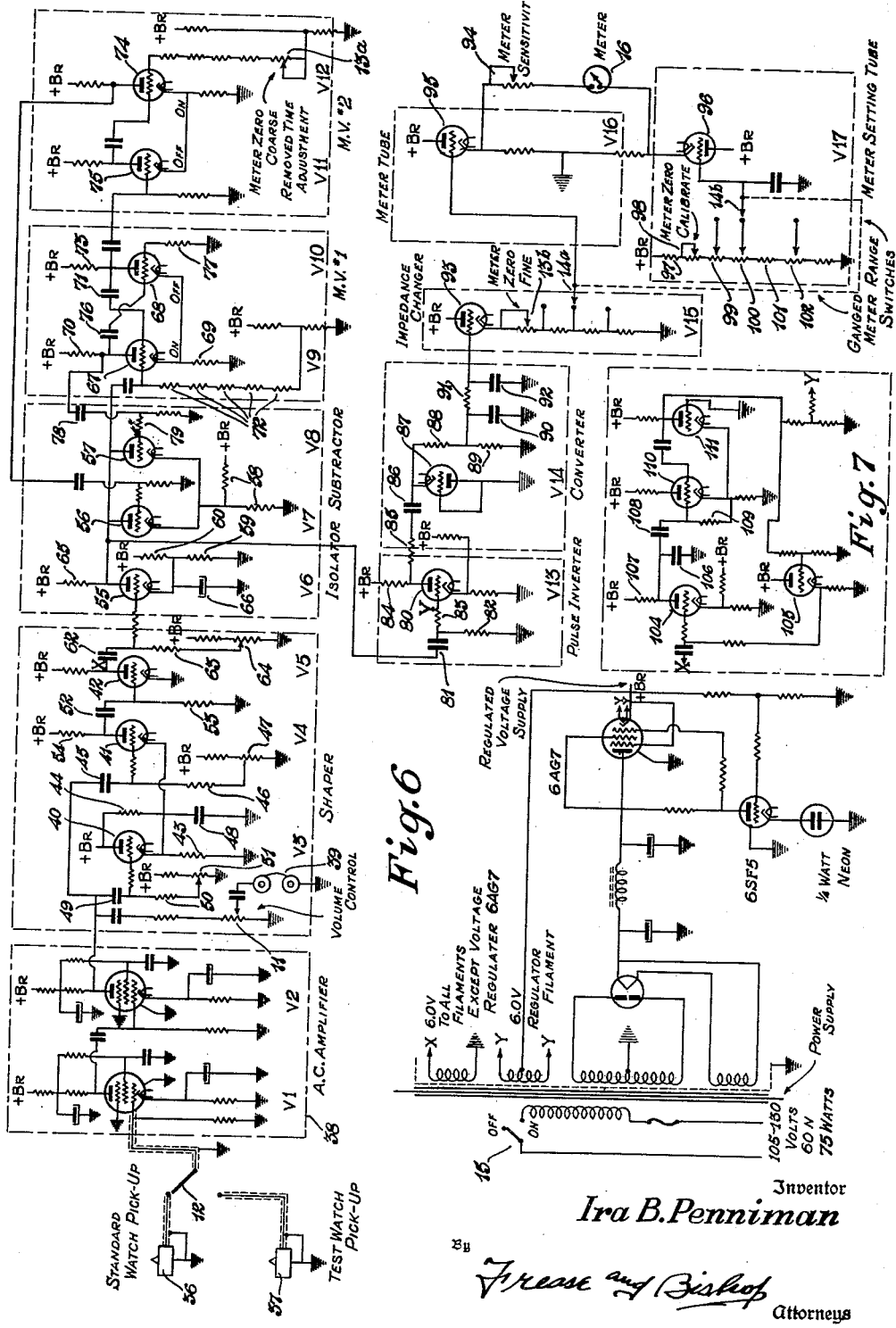
Inventor
Ira B. Penniman
By Frease and Bishop
Attorneys

UNITED STATES PATENT OFFICE 2,687,511

APPARATUS FOR TIMING OF PERIODIC EVENTS

Ira B. Penniman, Canton, Ohio

Application June 26, 1947, Serial No. 757,196

17 Claims. (Cl. 324—68)

The present invention embodies and this specification describes a basically new method for the precise and extremely accurate measurement of the rate of occurrence of periodic and/or cyclical events.

It is a generally accepted rule that there exists more than one basic principle, the use of any of which makes possible the accomplishment of the same given end result. A notable exception to this rule has existed in the measurement of frequency or of periodic events. It is universally accepted that the rate of occurrence of such phenomena is most accurately and/or easily measured by the method of beats, either stroboscopically or as a heterodyne. It is the express purpose of this specification to describe a fundamentally new, basic method for the accomplishment of this same end and to describe an equipment, utilizing this principle, adapted for the precise measurement of the rate of watches and chronometers. The indication is on a simple meter.

The basic principle upon which this new method of measurement of rates has been developed is essentially a practical simplification of the basic concept of all calculus, the four-step rule; wherein, from a quantity with a small variation is subtracted the original quantity, leaving only the small variation which is then divided by a small amount of time, or other variable, and the resulting ratio is carried to extremes, to infinitesimal amounts to define a rate at a given instant. All those versed in calculus appreciate that the derivative of a function is the rate of change of that function and the four-step rule is the basic principle and method for obtaining all derivatives.

In all but a very few cases, such as that of frequency modulation, the rate at a particular instant of time is not desired to be known. But rather, the desired rate is the average rate over a small amount of time, such as a few seconds or minutes. When the rate of occurrence of the periodic event is at least a few per second, and it may extend to many millions per second, the rate may be the average rate during one period of the event. Frequency, itself, is a rate expressed in cycles per second and since the very periodicity implies a definite time between two successive occurrences of the event, it follows that this time, the "quantity" of the four-step rule mentioned above, is a measure of the rate of occurrence of the event. Hence, the basic concept of calculus may be simplified, for practical application, to provide the average rate over one period of the periodic event, where one period is the time interval between two successive occurrences of the event.

The method of measurement of rate by beats as with a stroboscope or the heterodyne requires the presence, simultaneously, of two cyclical or periodic phenomena and the beginning of the period of one periodic phenomena does not coincide in time with the beginning of the period of the second periodic phenomena continuously for a large number of periods. In this new method of measurement, a fixed and unvarying, but adjustable, amount of time is removed from the period of the phenomena, that is, from the time between two successive occurrences of the periodic event. Only one periodic event is present at the time of measurement, however, and the fixed amount of time removed from the period of the event is always removed at the beginning of the period. This fixed and unvarying, but adjustable, time is always less than the period but is made as large a portion as possible. This leaves but a small portion of the original period, which portion will be a measure of the rate of occurrence of the phenomena. The slower the rate of the event, the longer the time between two successive occurrences of the event, but the amount of time subtracted from the period of the event remains unchanged leaving a longer amount of time remaining from the original period. The converse occurs for a faster rate.

In the four-step rule of calculus, which provides rates inherently, we subtract a quantity from this same quantity plus a small variation, at the time of subtraction, the quantity, itself, is a fixed quantity held so, momentarily, by the mathematician. Thus, for a practical simplification of this basic four-step rule, we may subtract any fixed quantity less than the period, so long as the quantity we subtract remains fixed and unvarying. It is not necessary that the quantity subtracted be equal to the variable at some given moment but only that the change in the variable be left intact.

To summarize the principle, break the cycle of events into a basic unit—the time between two successive occurrences of the event, called the "period" of the event, remove a fixed amount of time from the period, always less than the period, the remaining time of the period of the event is a direct measure of the rate of occurrence of the phenomena and any variation in rate of occurrence will be present in this remaining time. It is to be noted that what was originally a small variation in a large quantity has now become the same variation in a small quantity, resulting in an effective increase in percentage change.

This new method of measurement, and the equipment, were not originally developed as a simplification of the four-step rule of calculus, but were developed in an effort to increase the "percentage" variation in time between two successive occurrences of the event.

The presently described embodiment of the principle of my invention is for the precise timing of watches and chronometers, but the principle is equally adaptable to instruments for the measurement of frequency, both low and high, for the remote indication of industrial processes and for the synchronization of such processes.

There are included in the watch rating embodiment of my invention, several features of considerable value to the watch manufacturer and to the watch repairing jeweler not available in the other two types of watch timing devices currently available commercially. Both of these instruments operate on the stroboscopic principle, whereas, my invention operates to indicate a rate directly upon a meter previously calibrated.

One of the commercial watch rating machines uses a rotating member driven synchronously from a tuning fork, which could have been any other accurate standard. Devices of this type are very satisfactory in use but are expensive to manufacture and have proven to be prohibitively costly for many, due chiefly to the high cost of the accurate standard.

In the other type, a rotatable dial is driven at an approximately constant speed and means is provided for making comparison between a master watch and the dial and then between the watch to be tested and the dial. The dial usually requires reframing from time to time, that is, an adjustment is necessary to bring a zero of the dial opposite an index member. This type is difficult to read because of the motion of the rotating member which causes a precession of the marks on the rotating member when the watch being tested is not running at exactly the same rate as the watch controlling the rotating member, which they virtually never are.

The first mentioned commercial machine avoids this difficulty by printing this precession on a paper tape. In the machine of this invention, the indication is on a simple meter whereby the needle will stand still over a figure on the scale which indicates the rate directly. This forms a method of indication which is accurate, stable and may be read at a glance.

In the present machine, the operator has no chance to introduce an error of more than one second a day, whereas, with either of the other machines, there is an excellent chance that the operator will introduce errors of the order of a minute a day. In the second type mentioned above, the reframing may be overlooked completely causing a very large error. Such errors as are possible in the other machines may not, at first observation, seem to be of a serious degree but when it is considered that the jewelers attempt to set all watches 15 seconds a day fast, to compensate for the motions of the wearer which have this much slowing action, the above errors become exorbitant.

The present invention permits of no such large errors, reducing the human equation to a negligible point. Further, it contains no moving parts to become noise after extended use. In the present invention, the only parts which will deteriorate with time and use are the vacuum tubes which are standard types available at all local radio stores and which the radio service man may replace without any internal readjustments to the instrument.

My invention may be best understood by reference to the accompanying drawings, in which:

Fig. 6 is the schematic circuit diagram of the watch rating embodiment of my invention; and, Fig. 7 is the schematic circuit diagram of an alternative circuit which combines the function of the isolator-subtractor circuits and the timing circuits.

Figure 1:
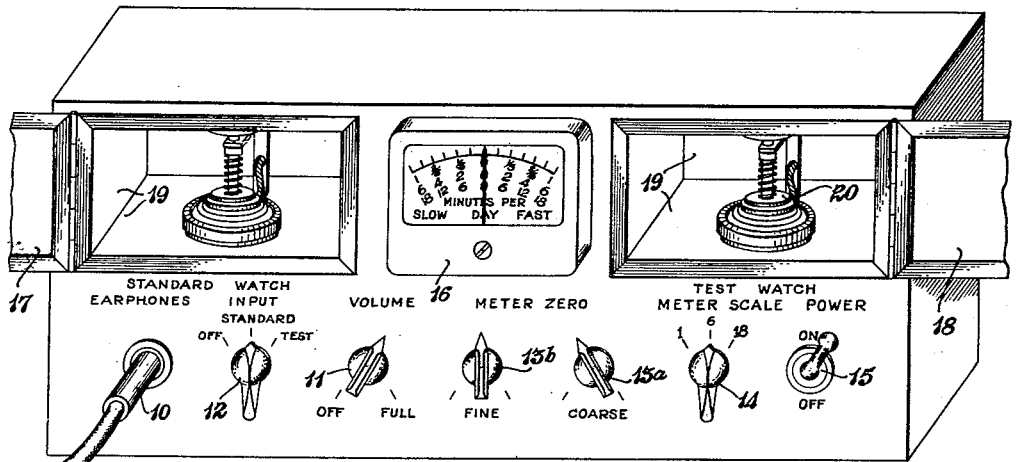
Figure 1 is a front panel view of the completed instrument showing the compartments containing the standard watch and the watch whose rate is to be determined or tested.

Referring to Figure 1, it is readily seen that the controls are few and of a nature such as to be relatively simple to operate, certainly no more complicated than tuning an all-wave radio receiver. An earphone plug and jack 10 are used to connect earphones to enable the jeweler to listen for unusual sounds in the watch at a greatly amplified level. A volume control 11 is provided to control the sound level issuing from the earphones. An input selector switch 12 is provided to permit easy selection of either the standard or the test watch as a signal source. A meter zero control, coarse adjustment, 13a is used to set the meter needle near the scale zero at mid-range of the actual meter. This control is set using the standard watch or chronometer as a signal source. A meter zero, fine adjustment, 13b is used to set the meter needle exactly on the scale zero at mid-range of the actual meter. This control is to be used only after setting the coarse zero control so that the meter pointer indicates within +40 seconds of scale zero.

Due to the nature of the circuitry, the only feasible place to insert a fine zero control, necessary because of the time lag in the coarse zero control, was in the cathode of the impedance changer tube 93. This control will change the meter sensitivity if too great a range of adjustment is allowed. In this instrument, the total range of fine zero control adjustment is limited to cause but a second order change in sensitivity. A meter scale selector switch 14, made up of two switch sections 14a and 14b on the circuit diagram of Fig. 6, is provided to change the range of meter indication for convenience in testing watches in which the rate is seriously out of adjustment. An on-off power switch 15 is provided.

The method of indication on a meter 16 is simple, straightforward and results in a steady indication on even the most sensitive scale providing genuine ease of operation and convenience. It will be noted that a so-called standard watch is used for calibration or meter zeroing. Any other means could have been used to determine how much of the period between two successive ticks of the watch should be subtracted.

However, the use of a standard watch for this purpose is convenient to a watchmaker since it is no great chore for him to keep one of a pair of watches, one in use while the second is being overhauled leisurely, running at exactly correct rate by observing the position of the hands after setting against the usual noon-day time signal.

It is entirely feasible to use a secondary interval standard such as an electrically driven tuning fork, a primary frequency standard—as the Bureau of Standards radio station WWV, or a secondary frequency standard, or even the humble multi-vibrator when temperature controlled and voltage regulated. As will be shown hereinafter, only one of these "sources" may be used at one time in contra-distinction to the stroboscopic or heterodyne method wherein both sources must be operating simultaneously.

To the left of the meter 16 is shown, in the open position, the door 17 to the sound-proofed compartment housing the standard watch and its holder and electro-mechanical signal pickup. This standard holder is a simplification of the test watch holder since the standard watch does not need to be rated in more than one position to set the meter zeros, whereas, five positions are required for the better watches. The right hand compartment 18 is shown with the door open. These two compartments 17 and 18 are lined with a suitable sound-proofing material 19, such as soft wall boarding. The right compartment 18 contains a watch holder 20 of more complicated form for rating a watch in five positions.

Figure 3:
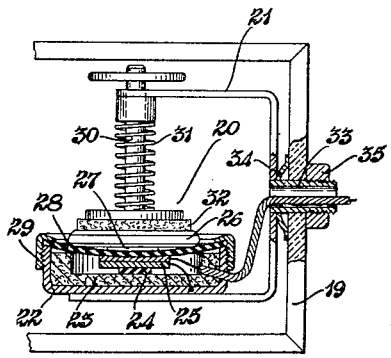
Fig. 3 is a sectional view of the stand used to hold the watch and to convert the audible tick of the watch, any watch, into an electrical impulse which, in turn, causes the circuits of the timer to operate through each cycle.

This holder 20 is shown in more detail in Fig. 3 wherein a C-shaped metal part 21 supports a cylindrical case 22 lined with a felt type of sound-proofing material 23. Supported in the center of case 22 on a very soft sponge rubber pad 24 is an electro-mechanical converter 25, which may be of the crystal type and which is in physical contact with the diaphragm 28. If expedient a metallic button 27 may be inserted through the diaphragm to form a more suitable conductor of the sound waves from the watch case 26 to the electro-mechanical converter 25. The rubber diaphragm 28 is clamped to the rim of the cylindrical case 22 by a retaining ring 29.

Thus, the watch and electro-mechanical converter 25 are essentially floating in space and are free from influence by extraneous room noises and vibrations which may be transmitted through the case and mount. A shaft 30 slidably held by the upper portion of the C frame 21 is pressed against the upper face of the watch case 26 by the spring 31.

To again prevent extraneous vibration pickup, the lower end of the shaft 30 is faced with soft sponge rubber 32. The entire C frame is supported rotatably by a hollow shaft 33, flexible spacer disc 34 and lock nut 35 to the sturdy rear wall of the sound proofed compartment 18 through sound proofing material 19.

The leads from the electro-mechanical converter 25 are highly flexible, are shielded, and are carried out through the rear wall of the sound proofed compartment inside the mounting shaft 33 with sufficient slack to prevent pulling and binding as the C assembly is rotated in rating the watch in each of the five various positions.

Figure 4:
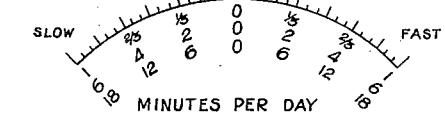
Fig. 4 is an example of one possible meter scale usable as the indicator of watch rate.

A typical scale for the meter 16 is shown in Fig. 4 where the zero is in the center of each of the scales. Due to the particular circuit used, the meter indications will always be to the left for a watch which is running at a slow rate and to the right for a fast rate. The three meter zeros, one for each scale, are independent of the scale used. Once the internal adjustments are made, and once zero has been established on any scale, the zero will remain fixed for the other scales.

Figure 2:
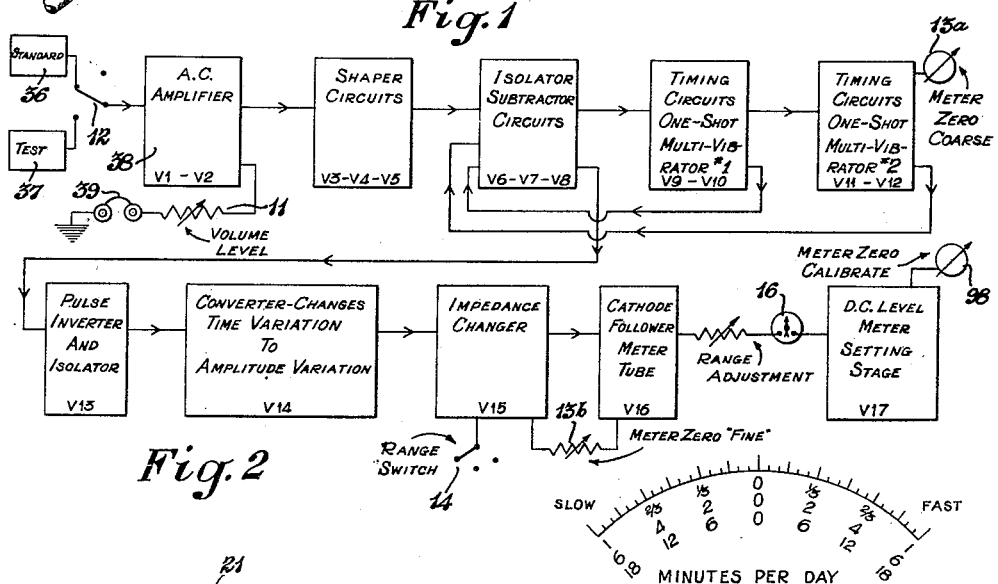
Fig. 2 is a block diagram of the watch timing embodiment of the principle of my invention.

In Fig. 2 is shown a block diagram of the watch rating embodiment of the principle of my invention. For ease of understanding reference should be made to the schematic circuit diagram of Fig. 6 in conjunction with Fig. 2 during the following discussion.

In the upper left of Fig. 2 is shown the standard watch tick pickup 36 and the test watch tick pickup 37 with the selector switch 12. One or the other signal is passed by the switch 12 to the input of a fairly high gain A. C. amplifier 38 of standard design.

To provide operation of the timing circuits at a distinct time during each tick sound, shaper circuits are used. The signal is fed from the A. C. amplifier to the shaper circuits, reformed by the shaper circuits to provide a single distinct trigger-type impulse for each watch tick, and the impulse is passed on to the isolator-subtractor circuits.

The isolator-subtractor circuits serve two functions. The isolator function is such that the single trigger-type impulse from each watch tick is amplified and passed on to the timing circuits. After this is done, no further signal can pass through the isolator-subtractor circuits until just prior to the next watch tick. This prevents any room sounds or ringing tones from the watch from causing incorrect operation of the remainder of the system.

Figure 5:
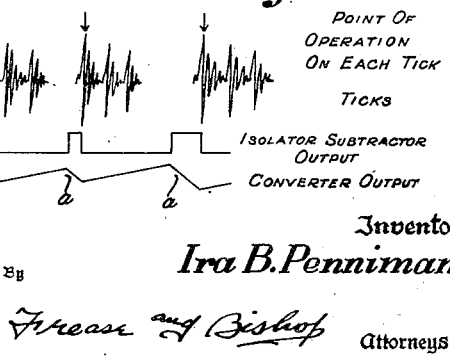
Fig. 5 illustrates typical waveforms of voltages necessary at specific points in any embodiment of the principle of my invention.

The subtractor action of these same isolator-subtractor circuits is the all important feature which produces a signal indicative of rate. The actions involved are somewhat complex, as follows: The single, trigger-type impulse from each watch tick is passed from the isolator-subtractor circuits to the timing circuits. The timing circuits should be considered as generating a signal lasting a definite, exact amount of time slightly less than the time from one tick to the next succeeding tick. This exact time signal is indicated, in Fig. 2, as being returned from the timing circuits to the isolator-subtractor circuits by the arrowed lines, below the clocks, leading to the left. Two vacuum tubes in the subtractor circuits, tubes 56 and 57 in Fig. 6, are caused to be successively biased to full zero-bias plate current by the exact time signal from the timing circuits. Refer to Fig. 5, to the curve marked "Isolator-subtractor output" which has the rectangular pulses. Consider this curve to be a graph having "time" for the horizontal scale, increasing to the right, and having voltage magnitude increasing upward. Then the lower line of the graph represents the condition of full maximum plate current in tubes 56 and 57 of the isolator-subtractor circuits as just described. As shown in Fig. 5 in the "isolator-subtractor output" curve, the exact timing signal ends just prior to the next tick. At the end of the exact timing signal, the tubes 56 and 57 are immediately biased to complete plate current cut-off which condition is represented, in the curve of Fig. 5, by the top of the pulses.

In Fig. 5, the rectangle formed by the lower line in the "isolator-subtractor output" curve may be considered as a negative, long time-of-duration pulse. This is the time that is fixed and unvarying, which always begins at the watch tick and ends sometime before the next succeeding watch tick. Therefore, should the time between ticks for one watch be longer than for another watch, the positive going, narrow pulses will be wider for the watch with longer time between ticks. This is shown in Fig. 5 where the time between the second and third ticks is longer than the time between the first and second ticks.

In Fig. 2, these narrow positive-going pulses are inverted in the "pulse inverter" shown at the lower left and are passed on unchanged to the "converter."

The "converter" changes pulse width to a voltage amplitude by means of a condenser-charging circuit. Hence, if the pulses are wider for one watch than with another watch, the condenser will have time to charge to a higher voltage during the wider pulses. Hence, the voltage value is a measure of pulse width which is a measure of rate. These circuits have a high impedance electrically. To prevent the vacuum tube voltmeter from affecting this condenser voltage a "cathode follower" tube is used solely for its ability to isolate a high impedance in its grid circuit from a low impedance in its plate-cathode circuit.

The signal voltage from the "cathode follower" tube is applied to one terminal of the D. C. milliammeter type indicating meter. The other terminal of the indicating meter is connected to a tube used to establish voltage reference values which are different for each of the three scales used.

It was further found that it was advantageous to the switching 12 and to the reduction of the 60 cycle hum induced in the watch tick pickups 36 and 37 to reduce the low frequency response to a very low value by reduction of the time constants of the inter-tube coupling circuits; otherwise, the A. C. amplifier 38 is of normal construction and high fidelity response. It was noted early in the work on this device that the watch tick, itself, is composed of two strong and distinct impulses from some watches and of three from others. This is shown in the top line of Fig. 5. These ticks have the form of a modulated wave. The carrier-frequency of a large number of conventional watches was found to lie in the range from 1500 to 2500 cycles per second and is generated in the watch by the tuning fork type of ringing in the various parts of the watch, especially those associated with the balance wheel and hair spring, the fork, the escapement wheel and pallet jewels. The modulation is a measure of the force, moment by moment, between two of the above parts when they come into sudden contact during the normal operation of the watch.

The circuits following the A. C. amplifier 38 must always operate from the same point of each tick to avoid the introduction of a false error in the indicated rate. Any variation in the time of operation of the circuits following the A. C. amplifier 38 must be due to a variation in the time of occurrence of the watch tick, due in turn, to a variation in watch rate, and must not be due to a variation in the time of operation on the tick itself. When correct operation has been made to take place, it is quite easy to measure errors as small as 5 seconds a day in watch rate, which is a percentage error of 0.006%, a particularly small percentage.

In other embodiments of the principle of my invention, such as in the measurement of frequency where the nature of the signal is such as to provide a single distinct trigger at the beginning of each occurrence of the event and where the time of occurrence of such triggers does not vary greatly from occurrence to occurrence, it has been found to be entirely practical for changes in rate as small as 0.0001% to cause large movements of the meter needle. Smaller changes may be entirely practical but have not been tried at the time of writing this specification.

The output of the A. C. amplifier 38 may be monitored by use of the earphone 39 in which the loudness level may be set by the volume control 11. The output of the A. C. amplifier is also introduced into the two inputs of a specially designed watch-tick-shaping circuit composed of tubes 40, 41 and 42. The purpose of these shaping circuits is to reform the watch tick so that the succeeding circuits will always operate from the same point on the watch tick. The portions of the watch tick which were found not to vary appreciably in time were the positive and negative tips of the peaks of the three impulses. These shaper circuits are designed to operate on the positive peak of the first impulse.

If some source of periodic phenomena other than the watch tick is used, it may be necessary to provide shaping circuits of different configuration between the A. C. amplifier output and the isolator-subtractor circuit input, depending upon the nature of the signal of the periodic phenomena being measured.

It should be recalled that all high vacuum tubes of the amplifying type have a so-called plate-current cut-off, grid-to-cathode potential, negative usually, for each D. C. plate supply voltage $+Br$. Almost all of the tubes used in this instrument are used as switches, or as momentary amplifiers, whereby they are either completely cut off or are completely turned on, zero grid-to-cathode potential, and are only occasionally working in the region between cut off and zero bias.

Such is the case with the shaper tubes 40, 41 and 42 which operate to shape the watch tick to cause operation of the succeeding circuits always to be on the exact positive-going peak of the first impulse of the watch tick. The operation of these tubes is somewhat unconventional and they are used in a completely new circuit configuration to the best of the writer's knowledge and, hence, will be described in detail.

It was desired to eliminate the main body of the first impulse and to pass through the shaper tubes only the amplified positive peak of this first impulse. This is accomplished by a degenerative action in tube 41. The cathode of tube 41 is held at a positive potential, some two to three times the value of the plate current cut-off potential, by the bleeder system made up of resistors 43 and 44. The watch tick from the A. C. amplifier 38 is passed or coupled to the control grid of tube 41 by the condenser 45 and resistor 46. The tube 41 is maintained in a well cut-off condition by returning the grid to a sufficiently negative potential, with respect to the cathode, on bleeder potentiometer 47. As a result, any negative going portions of the watch tick will only further insure the complete cut off of tube 41. The positive going portions will, however, bring the tube 41 into a conducting condition, whereupon, the positive portion of the first impulse which is sufficiently positive to cause conduction in tube 41, will appear as an amplified, negative-going replica at the plate of tube 41.

The potential level of the grid as fixed by potentiometer 47, will determine how much of the positive peak of the first impulse will lie in the conducting region of tube 41, and this level will be set to permit a considerable part of the positive portion of the body of the first impulse, as well as, the positive peak, to cause conduction of plate current in tube 41. The action of tube 40 will be omitted for the moment, since it would only serve to complicate the description and its action may be introduced conveniently later on. When the watch tick becomes sufficiently positive to cause tube 41 to pass some plate current, this flow of plate current through the cathode resistor 43 will cause the cathode potential to rise positively. Since the plate current of tube 41 is determined by the net difference in potential between tube 41's grid and cathode, and since the cathode resistance 43 is fairly large, this net difference in grid to cathode potential will remain quite small for moderately sized signals.

The condenser 48, of proper value, was inserted across resistor 43 to produce just sufficient time constant to prevent the cathode potential of tube 41 from "following" the relatively large magnitude, positive peak of the first impulse of the watch tick but to permit the cathode potential to rise positively to produce a reasonable replica of the main body of the positive impulse. It was found, however, that too much of the body of the positive impulse appeared at the plate of tube 41 and the succeeding circuits would operate on the first part of the body of the impulse to cause a false error in the indicated rate. These first parts of the body of the impulse were found to vary in time due to the sloping leading edge of the impulse and due to the somewhat fluctuating magnitude of the watch tick. The error due to this action amounted to as much as a minute a day "false" error in watch rate, an intolerable condition. It is necessary, then, to introduce a degenerative signal on the cathode of tube 41 without plate current flow in tube 41. This was accomplished by the use of tube 40.

The same output of the A. C. amplifier 38 that was coupled to the control grid of tube 41 is also coupled to the grid of tube 40 by means of condenser 49 and resistor 50. The plate of tube 40 is connected directly to the positive direct current supply, +Br, so that the only resistance external to tube 40 which can operate to limit its plate current is the resistance 43 common to both tube 40 and tube 41, whereas, the plate current in tube 41 is restricted, in addition, by the resistance 54. Tube 40 is maintained in a cut-off condition by returning the control grid to a sufficiently negative potential, with respect to its cathode, on the bleeder potentiometer 51. The action at the grid of tube 40 is identical to that on the grid of tube 41, so that negative going portions of the watch tick only serve to insure the complete plate current cut-off of tube 40 and the more positive portions of the positive going parts of the watch tick will cause conduction of tube 40.

The bleeder potentiometers 47 and 51 are adjusted so as to cause the more positive portions of the positive part of the body of the watch tick to produce equal potential rises, moment by moment, on the grid and the cathode of tube 41. As a result, no plate current flows in tube 41 and no signal appears at the plate of tube 41 during the body of the impulse. Due to the action of condenser 48 and resistor 43, the positive peak of the watch tick impulse does not appear with any appreciable magnitude at the cathode of tube 41 but does appear in full strength at the control grid of tube 41. This net difference in potential between grid and cathode of tube 41 during the positive peak of the impulse is of such polarity and of sufficient magnitude to cause conduction in tube 41 resulting in a negative going replica of the peak of the impulse only, which is the shaping desired. This circuit was found to be remarkably insensitive to quite large changes in magnitude of the tick from various watches and so serves the desired purpose admirably.

A negative going replica of the positive peak of the impulse which appears at the plate of tube 41 is quite weak, so much so as to be unusable without further amplification. This amplification is supplied by tube 42 which operates with zero grid to cathode potential without signal applied. When the relatively weak negative going peak of the watch tick appears at the grid of tube 42 through coupling condenser 52 and resistor 53, the plate current of tube 42 is reduced causing the plate of tube 42 to reproduce an amplified positive going replica of the peak of the watch tick.

The output of tube 42, at its plate, is coupled to the input of a specially designed isolator-subtractor circuit composed of tubes 55, 56 and 57 and associated parts. This circuit is highly unconventional in operation and involves the signals or pulses from the timing circuits. Hence, it is believed the operation will be more readily understood by describing the operation of the timing circuits at this point in the specification.

Consider first the simpler multi-vibrator labeled MV #2 in the upper right block of Figs. 2 and 6. With no trigger signal applied, this multi-vibrator does not oscillate and no pulses are generated by it. In this quiescent condition, tube 74 has zero bias by virtue of the control grid return to the positive tap on the bleeder. Tube 74 is, thus, passing the maximum possible plate current through its plate resistor and through the common cathode resistor. Tube 75 is completely cut-off and is passing no plate current. The plate current of tube 74 flowing through the common cathode resistance develops sufficient voltage at the cathode of tube 75 to cause plate current cut-off in tube 75 by virtue of the control grid being returned to ground.

Hence, tube 74 is full-on in the quiescent, or idle condition, called the "on" tube, and tube 75 is completely turned off, called the "off" tube, and there is no tendency for the tubes to switch. The plate potential of tube 74 is lower than the +Br potential, due to the flow of plate current through the plate resistor, and is of the order of +70 volts with respect to ground. The plate potential of tube 75 is at +Br, due to complete lack of any plate current flow in its plate resistor.

To cause the tubes to interchange or switch so that tube 74 is cut-off and tube 75 is completely on, a negative trigger pulse may be applied to the control grid of tube 74 or a positive trigger pulse of sufficient magnitude may be applied to the control grid of tube 75. In MV #2 a large positive trigger is applied to the control grid of tube 75. (The source of this trigger pulse will be explained as this description progresses.)

The large positive trigger is sufficiently large to cause the potential of the control grid of tube 75 to equal the potential of the cathode of tube 75. Tube 75 then conducts plate current through its plate resistor and through the common cathode resistor. The plate current flow through the plate resistor of tube 75 causes the plate potential of tube 75 to fall to a voltage below +Br, such as +70 volts with respect to ground. The condenser connecting the plate of tube 75 and the grid of tube 74 cannot change its charge and, hence, the voltage across it, as rapidly as the plate potential of tube 75 is made to fall. Hence, the grid potential of tube 74, with respect to ground, is made to be very negative. The cathode of tube 74 with respect to ground is still positive due to the flow of plate current from tube 75. As a result, all plate current in tube 74 is stopped and tube 75 is passing plate current.

To prevent the plate current of tube 75 from developing sufficient voltage across the common cathode resistor to cause the tube 75 to be cut-off (as the plate current of tube 74 did during quiescence or idle), the value of the plate resistors for the two tubes is made to be sufficiently different. Tube 74 has the lower plate resistance and tube 75 has some five times as high a value of plate resistor.

In this switched condition, tube 74 is completely turned off and tube 75 is turned on. The plate potential of tube 74 has risen to the full +Br value and the plate potential of tube 75 is down to some +70 volts with respect to ground. The multi-vibrator will stay in this condition until the condenser, connected between the plate of tube 75 and the grid of tube 74, can lose most of its charge through the relatively high-value grid resistor of tube 74; when the potential across this condenser will have been reduced sufficiently to allow the grid to cathode potential to be less than the plate current cut-off value. When this cut-off (or cut-on) potential is reached, the tube 74 will begin to pass plate current through its plate resistor and through the common cathode resistor. The rise in cathode to ground voltage will increase the cathode to grid voltage of tube 75 causing tube 75 to pass less and less plate current. By virtue of the plate resistor of tube 74 being one-fifth of the value of the plate resistor of tube 75 and by virtue of the plate to grid coupling between tubes 75 and 74, respectively, the effect of the increase in the plate current of tube 74 will be greater than the effect of the decrease in plate current of tube 75. The cathode to ground potential will then increase until tube 75 is completely cut-off and passes no plate current. Tube 74 will be completely on and will be passing its maximum plate current and the original quiescent or idle conditions have been re-established. The condenser between the plate of tube 75 and the grid of tube 74 will now recharge to its original or quiescent value. The multi-vibrator will now remain in this condition indefinitely until another trigger pulse is applied to either of the control grids.

From the above description, it may be seen that the plate potential of the "on" tube 74 (during quiescence) is lower than +Br. Upon application of a trigger pulse it rises to +Br and remains there during the timing period when it returns abruptly to its former lower voltage. The plate potential of the "off" tube 75 varies in the reverse fashion, being at +Br during quiescence, falling to a low value upon triggering and holding this lower value during the timing interval to return to the +Br voltage value abruptly at the end of the timing interval.

The timing signal or pulse supplied by the "timing" multivibrators to the "isolator-subtractor" circuits is the positive going pulse from the plate of the so-called normally "on" tube 74.

The two multi-vibrators are identical in their operation and have just two differences between them, both of which are used to increase the sensitivity to triggering. Multi-vibrator #2, as mentioned before, is triggered by a positive going large pulse applied to the control grid of the tube 75 which has plate current cut-off bias during quiescence or idle. Multi-vibrator #1 is triggered by a negative going pulse applied to the control grid of the tube 67, Fig. 6, which is the "normally on" tube and is passing its full plate current in the quiescent state at the time of triggering. This has the effect of increasing its sensitivity to triggering; i. e., it requires a smaller magnitude trigger pulse on the "normally on" grid. The second difference between the two multi-vibrators occurs in the use of a very small capacity condenser 76 between the plate of the normally "on" tube 67 and the control grid of the normally "off" tube 68. This is the reverse connection to the previously described condenser. This condenser 76 further increases the sensitivity to triggering so that quite small negative going trigger pulses are required on the first multi-vibrator. As with MV #2, the useful output of MV #1 to the "isolator-subtractor" circuits is the positive going pulse from the plate of the "normally on" tube 67.

These positive pulses are used in the isolator-subtractor circuits intact and unaltered. This is accomplished by connecting the plate of the normally on tubes 67 in MV #1 and tube 74 in MV #2 to relatively large capacity condensers such as 78 in MV #1. This condenser has in series with it a high value resistance (next to the figure 79) so that the resultant time constant for charging and discharging condenser 78 is very long compared to the length of time of the positive going pulse from the multi-vibrator. Hence, it loses or gains virtually no charge (or voltage) during the pulse and so no alteration of the pulse can occur.

The sequence of operation of these two multi-vibrators is as follows: The single trigger pulse from the watch tick is passed by the isolator-subtractor by condenser coupling to the control grid of the normally on tube 67 of the first multi-vibrator, MV #1, Fig. 6. MV #2 remains in its quiescent state. MV #1 stays in the triggered state for the specified time determined by condenser 71 and resistors 72. Instantly, as MV #1 switches back to its quiescent state, MV #2 is triggered to its "switched" or timing condition. MV #1 remains in its quiescent state and MV #2 remains in its timing state until the condenser connecting the plate of tube 75 to the control grid of tube 74 can discharge when MV #2 switches back to its quiescent state. MV #1 still remains in its quiescent state. Hence, both MV #1 and #2 are now in the quiescent state and remain there until the next trigger from the watch tick.

It is thus seen that MV #1 produces its positive timing pulse followed instantly by MV #2 so that the combined positive timing pulses follow each other to form one long timing pulse.

Combined, these pulses; i. e., the one long timing pulse represents the time to be "subtracted" and is adjusted by variable resistor 13a in MV #2 to be slightly less than the time between two successive watch ticks.

The trigger signal from MV #1 which triggers MV #2 must be positive going and must occur at the end of the timing period of MV #1. The timing pulse at the plate of the normally off tube, 68 in MV #1, will be returning from a low voltage value to the +Br voltage value at the end of the timing period of MV #1 and, hence, satisfies all the above requirements. When MV #1 is initially triggered a negative going pulse appears at this normally off plate of tube 68. However, the grid of the normally off tube 75 in MV #2 is already below cut-off so that a negative pulse only further insures plate current cut-off and has no effect toward causing MV #2 to switch.

This constitutes the complete action of the timing circuits, as such. The part necessary to remember when considering the isolator-subtractor circuit action is that two large magnitude, positive going, rectangular, voltage pulses which occur one instantly after the other are coupled from the timing circuits to the isolator-subtractor. It is also necessary to consider that the first of these pulses starts exactly at the moment of occurrence of the watch tick trigger pulse and that the second pulse ends at a constant and fixed but adjustable time after the beginning of the first positive pulse and that this ending is a small time before the next succeeding watch tick trigger pulse.

In the quiescent or idle condition with no watch tick being applied, the tubes in the isolator-subtractor circuits are in the following condition. The cathode of tube 55 is biased to a moderately positive potential, such as +60 volts, with respect to ground by the bleeder made up of resistors 59 and 60. The control grid of tube 55 is held at a considerably lower positive potential by being returned to adjustable bleeder 64. The net voltage difference between the control grid and the cathode is such as to prevent any plate current flow through tube 55 or through its plate resistor 65.

The circuits of tubes 56 and 57 are identical. The cathodes of tubes 56 and 57 are jointly held at a positive potential such as +18 volts, with respect to ground, by connection to the bleeder 58. The control grids of tubes 56 and 57 are at ground potential so that the net voltage difference between the control grid and cathode of each of these tubes is 18 volts in such polarity as to cause complete plate current cut-off. Hence, there is no plate current flow from any tube through plate resistor 65 at quiescence and with no signal applied and the three plates of the three tubes 55, 56 and 57 are at the full +Br potential.

Application of a watch tick signal to the A. C. amplifier 38, then to the shaper circuits, produces a positive going pulse at the plate of shaper tube 42, as described previously. This positive pulse is applied to the control grid of isolator-subtractor tube 55 by means of coupling condenser 62 and grid return resistor 63. Since the large capacity by-pass condenser 66 connected between the cathode of tube 55 and ground prevents any rise in cathode potential when tube 55 passes plate current, the full positive pulse applied to the control grid of tube 55 is effective in causing conduction of plate current through tube 55. The flow of plate current for tube 55 through the plate resistor 65 causes the plate potential of all three plates of the three tubes 55, 56 and 57 to assume a potential less positive than +Br. This relatively sudden decrease in plate potential is coupled to the control grid of the first multi-vibrator MV #1 by means of a condenser of appropriate capacity.

As a result of the above coupling and triggering, the two multi-vibrators will switch, one after the other, to generate the previously described, large magnitude, positive going, rectangular, timing signals. The positive timing signal from MV #1 is coupled to the control grid of subtractor tube 57 while the positive timing pulse from MV #2 is coupled to the control grid of subtractor tube 56. These couplings are each of very long time constant so that the pulse is transmitted without change to the control grids of tubes 56 and 57.

Further, these timing pulses are of sufficient magnitude to cause the respective control grids to become slightly positive with respect to their corresponding cathodes. As a result, the tubes 56 and 57 each, one after the other, conduct their maximum plate current. This plate current must flow through plate resistor 65 which causes the plate potential of the three tubes 55, 56 and 57 to fall to a very low positive potential. The values of resistance and bias have been so chosen that this common plate potential is about +40 volts. The cathode of tube 55 is biased to +60 volts so that no plate current may flow through tube 55 during the time the "timing" pulses from the multi-vibrators are active on the control grids of tubes 56 and 57, even though relatively large signal pulses should be applied to the control grid of tube 55. This constitutes the isolator action in that all the timing circuits and succeeding "rate" measuring circuits are isolated from extraneous signals during the timing period.

It is seen then, that the watch tick trigger pulse has been passed by tube 55 to MV #1. The positive pulse from the normally on tube 67 of MV #1 begins at the instant of triggering by the watch tick, lasts for a predetermined length of time and ends. That this positive pulse, applied to the control grid of tube 57, causes the three connected plates of tubes 55, 56 and 57 to fall to a low potential and to remain at this potential throughout the duration of the timing period of MV #1. MV #1, then, switches back to its idling condition which switching instantly triggers MV #2. The positive pulse from the plate of the normally on tube 75 of MV #2, lasts for a predetermined length of time and ends. That this positive pulse, applied to the control grid of tube 56 causes the three connected plates of tubes 55, 56 and 57 to remain at the same low potential maintained during the timing period of MV #1. Hence, the three plates fall to the low potential at the instant the watch tick trigger pulse is passed by tube 55 and remain at the low potential until the end of the timing period of the second multi-vibrator when tube 56 control grid is returned to ground potential and tube 56 is again cut-off or unable to pass any plate current. Tube 57 was returned to this no plate current condition at the end of the timing period of MV #1. Hence, the three plates of tubes 55, 56 and 57 jointly return to +Br potential and remain there until the next watch tick signal arrives. This wave form of voltage at the three plates of tubes 55, 56 and 57 as just described is shown as the rectangular wave of voltage in Fig. 5, titled "Isolator-subtractor output."

In tube 57, the use of the extra resistor 79 between the positive, timing pulse, coupling circuit and the control grid of tube 57, is necessary to prevent the quite low internal grid to cathode tube resistance from shorting the quite high resistance of the coupling circuit. This low internal grid resistance exists only when the control grid is slightly positive with respect to its cathode. Thus, the necessary long time constant for the coupling circuit is maintained. This was found to be sufficiently effective that a similar isolation was provided in the control grid circuits of tubes 56, 40, 41, 55 and 80.

It is believed that the foregoing description will bring out and make clear the basic operation and the principle of operation as outlined in the earlier part of this specification. Namely; from one cycle of events—the time between two successive occurrences of the event (watch ticks)—remove a fixed amount of time from the beginning portion of the time between events, always less than the time between events, the remaining time appearing as a positive pulse in which the width of the pulse is representative of the rate of the event, and in which a change in rate will cause a change in width of this positive going pulse. It remains then to show the mechanism for converison of pulse width to a proportionate D. C. voltage which may be made to operate a meter.

The output of the isolator-subtractor circuits, at the plates of tubes 55, 56 and 57, which output is a short-time duration, positive-going, rectangular pulse, is applied by the coupling circuit composed of condenser 81 and resistors 82 and 83 to the control grid of tube 80. Tube 80 is normally biased well beyond cut-off, so that, the positive rectangular pulse from the isolator-subtractor circuits will bring tube 80 to full conduction and a large magnitude but negative going replica of the original rectangular pulse will appear at the plate of tube 80.

During the idling period between these relatively short time duration pulses, which idle time is much the greater portion of the period between watch ticks, the plate of tube 80 is at the +Br potential. The one plate of condenser 86 is connected to the plate of tube 80 through the resistor 85 while the other plate is connected to ground potential through resistors 88 and 89. As a result of these connections and the relatively long idling time, the condenser 86 will charge up to the full +Br potential. When the rectangular pulse occurs the potential of the plate of tube 80 will fall to a low value with respect to ground.

Now, since a condenser cannot change its charge instantly but only at a rate determined by the product of the capacity of the condenser and of the net total resistance of all circuits connected across the condenser, and since the side of the condenser connected to the plate of tube 80 is trying to change potential in a negative direction it follows that the side of the condenser connected to resistor 88 and to the cathode of tube 87 will also try to change potential in a negative direction.

Tube 87 is a triode connected to act as a diode which will be conductive when a negative going wave is applied to its ungrounded or cathode element. Hence, the plate of condenser 86 which is connected to the cathode of tube 87 will go in a negative direction, when the rectangular pulse is applied; but only until the cathode of tube 87 is at a slightly negative potential with respect to the grid and plate of tube 87 and to ground. This action is variously known as diode detection and as diode clamping.

Since condenser 86 can discharge at no more than a slow rate it will not be able to lose very much of its charge during the time duration of the rectangular pulse. Note, though, that the time duration of the rectangular pulse is a measure of the speed or time rate of the watch. Hence, the charge lost by, and so the potential change of, condenser 86 is also a measure of the rate of the watch or other phenomena being measured. Resistor 84 is much smaller than resistor 85 so that the plate of tube 80 does always go to a low potential during the short rectangular pulse which provides a constant potential for condenser 86 to discharge to and, hence, linear potential loss on condenser 86 with change in time duration of the rectangular pulse.

The resistance of a diode of the type of tube 87 is of the order of 2000 to 5000 ohms. Resistors 88 and 89 are each of the order of ten to fifteen million ohms (megohms). Hence, when diode 87 is conducting, the discharge period for condenser 86 during the short rectangular pulse, condenser 86 loses charge at a relatively fast rate determined principally by resistor 85. Electrons will flow from the plate of condenser 86 into the cathode of tube 87 to the plate of tube 87 and through tube 80 and resistance 85 to the other plate of condenser 86. The potential drop across diode tube 87 will cause some current flow through resistors 88 and 89 in such a direction as to make the junction of resistors 88 and 89 acquire a negative voltage with respect to ground. This negative voltage will charge condenser 90 to the same negative voltage. This is shown in Fig. 5, the bottom curve, at the downward sloping portions labelled "a."

When the rectangular pulse ends, it always ends abruptly due to the triggering action of the one-shot multi-vibrators, the plate of condenser 86 rises to the plus +Br potential and the plate of condenser 86 which is connected to the cathode of tube 87 and to resistor 88 rises in a positive direction also. Since the diode tube cannot conduct when its cathode is positive with respect to its plate, the 2000 to 5000 ohms of the diode tube 87 is removed from the circuit and the condenser 86 recharges through the quite high resistances 88 and 89.

Under these conditions, the current flow will be in a reverse direction and the junction of resistors 88 and 89 and condenser 90 will rise to a positive potential. This positive potential will be directly proportional to the charge lost by condenser 86 during the time duration of the rectangular pulse and, hence, will be directly proportional to the rate of the watch being measured. The values of the resistors 88 and 89 and of condenser 90 are such that a number of periods of the watch ticks are required to produce the final steady positive potential on condenser 90.

Due to the fact that the hair spring and balance wheel in a watch rotate first in one direction and then in the other and due to the possibility of mechanical misadjustment, the balance wheel may rotate farther in one direction than in the other, which results in the balance wheel taking a longer time in the farther direction and taking a shorter time in the near direction.

This is the mechanism by which some watches will have a longer "tick to tock" period than a "tock to tick" period. This is illustrated in the bottom curve of Fig. 5. As a result, the potential across condenser 90 will fluctuate unless the time-constant is set to be sufficiently long to integrate and average these fluctuations over a number of periods of the watch ticks.

The resistor 91 and the condenser 92 form a filter to remove the variations shown in the bottom curve of Fig. 5 which appear across condenser 90 and which, then, do not appear across condenser 92. Condenser 92 maintains a steady and stable direct current potential whose magnitude is directly proportional to the time width of the rectangular "error" pulse. The changes in this D. C. potential, due to variations in width of the rectangular "error" pulse remaining from the watch tick period, are directly proportional to the rate of the watch.

The tube 93 is connected as a cathode-follower which type of connection is quite commonly used in television work and will be familiar with those skilled in the art. The cathode-follower is here being used for its ability to transform and isolate impedences which, in this case, are D. C. resistances. The cathode resistance of tube 93 has been tapped, as shown in Fig. 6, to provide various ranges.

The meter 16 and its sensitivity control 95 act as a low resistance D. C. voltmeter. The meter in the present instrument is a 0–400 microampere meter but meters of almost any sensitivity may be used by changing the tubes 95 and 96 to types capable of delivering larger current. The tubes 95 and 96 act as cathode-followers and the meter will indicate the difference in their cathode potentials. The cathode potential of tube 95 is determined by the cathode potential of tube 93 which is determined by the watch rate, itself.

Note that the cathode potential of tube 93, and so, of tube 95 becomes more positive when the rate is slower and less positive when the rate is faster. In order that the meter shall read down scale for slower watch rate, the difference in cathode potential of tubes 95 and 96 must become smaller. This requires that the cathode of tube 96 be more positive than that of tube 95. The cathode potential of tube 96 is set for each range by the taps on the adjustable bleeder made up of resistors 97 through 102.

At this time it is necessary to describe a typical zero setting and unknown-watch rate determination to show how the various ranges are obtained. The meter sensitivity requires a definite and exact potential at the grid of tube 93 to cause the meter to read zero at the center of its scale. This in turn requires a definite time duration for the rectangular pulse which is the amount of time left from the original period of the watch ticks, since diode tube 87 and associated circuits convert pulse time width variations into D. C. voltage magnitude variations. It is most convenient to ultilize the ticks from a watch which is known to be running at an exactly correct rate.

With the entire instrument operating in synchronism with the ticks from this standard watch, the length of time to be subtracted from the period is set by adjusting the period of the second one-shot multi-vibrator at 13a until the rectangular pulse remaining from the standard watch's period has exactly the correct time duration to produce the exactly correct D. C. voltage to cause the meter to read the center of its scale which is marked zero.

Since the timing circuits are extremely stable, once the instrument has become thoroughly warm, the same unvarying amount of time will be subtracted from any other length of period from any other watch. If the test watch is slow, its period will be longer than that of the standard and the rectangular pulse left will be longer than when the standard watch was used. A longer rectangular pulse will produce a higher D. C. voltage and the meter will register less voltage difference between the cathode of tubes 95 and 96 by reading down scale from the center. A change in rate of one minute per day will change the time duration of the remaining rectangular pulse by 139 micro-seconds (.000139 second) which will produce almost exactly one volt variation in D. C. voltage level on the cathode of tube 93.

The scale is exactly linear since the discharge of condenser 86 was made deliberately small to operate on the linear portion of its exponential discharge curve. Thus, by tapping down on the cathode resistance of tube 93, the voltage change required at the cathode of tube 93 to move the meter needle from center scale to its limit, either up scale or down scale, will be multiplied by the ratio of the total cathode to ground resistance divided by the tap to ground resistance.

It was found that all parts of this instrument required excellent D. C. +Br voltage regulation. A gas tube type regulator, the VR–150–30, was tried but was found to be too imperfect in its regulation. An amplifying type high vacuum tube regulator was then used with excellent stability throughout the instrument. Such regulators are quite commonplace to those skilled in the art as is the full wave rectifier. For those interested in the voltage regulators, one excellent article has appeared in the trade magazine "Electronics" for July, 1938, page 26.

It may be noted that some of the tubes used are operated with fairly high voltage between their cathodes and their filaments. Present tube construction will permit some 100 volts difference without danger of breakdown, and none of the tubes as used here are operated at a higher cathode to filament potential than 60 volts.

It is felt that this instrument supplies a definite need in the watchmaker's profession and is especially applicable since it may be manufactured and sold at a retail price somewhat less than one-half that of a reliable instrument now on the market. It is believed to be easier to use and the rate is more readily and conveniently obtained than all other watch rating instruments presently on the market.

I should like to clarify at this point, the exact portions of this embodiment of the principle of my invention which are essential to any embodiment of the principle of my invention. These portions are necessary to produce a measurable voltage change proportional to the rate of the phenomena but the circuit configurations may take radically different forms. A specific example of such a change may be made in the case of the isolator-subtractor circuits wherein a tube of the grid controlled thyratron type may be used to provide the isolation action and the subtraction action and may in certain cases, where the thyratron plate potential is restrained from rising above the extinction value, be caused to produce the time to be subtracted. Thus all the tubes and circuits included in the isolator-subtractor circuits and the two multi-vibrators composing the timing circuits may be replaced by the much simpler thyratron circuit in some applications. The specific portions always required are the isolator-subtractor circuit, the timing circuits, the converter circuit, a meter and circuit, a power supply and, of course, a source of signal all interconnected in such fashion, as necessary, to produce the basic actions herein described and where such circuits may take any form required separately or in combination so long as these basic functions are performed.

The alternative circuit configuration mentioned above is shown in Fig. 7. This circuit combines the functions of isolation through the action of tube 105 of subtraction and of the timing circuits. The gas filled thyratron tube 104 is normally non-conducting with its grid cathode potential only a volt or two beyond cut-off just prior to the incidence of the watch tick. Its plate will be at $+Br$ potential and condenser 106 will be fully charged to $+Br$.

The positive peak of the first impulse of the watch tick will cause thyratron tube 104 to become conducting, whereupon, condenser 106 will discharge rapidly through the thyratron tube 104. The plate potential of thyratron tube 104 will fall below the extinction potential for the thyratron used and condenser 106 will be able to recharge through resistance 107. Resistance 107 and condenser 106 are both large in electrical value and provide the timing action.

Resistance 109 and condenser 108 provide a coupling circuit to the grid of the normally on tube 110 of a one-shot multi-vibrator; so that, when the condenser 106 starts to discharge through the thyratron tube 104 at the incidence of the watch tick, the multi-vibrator is caused to switch in the normal fashion. This multi-vibrator, however, is designed to have a very short cycle time of the order of 300 micro-second (.000300 second) and would normally switch back to the idling state were it not for the action of condenser 106 and the coupling circuit composed of condenser 108 and resistance 109 in holding the grid of the normally on tube 110 at a more than cut-off potential. When the potential of condenser 106 has risen almost to the fully charged value, $+Br$, the said coupling circuit will have raised the grid of the normally on tube 110 to such a value that tube 110 will become conductive and the multi-vibrator will switch back to its idling state.

Thus, the subtracting action is provided in such manner that the positive going pulse applied to succeeding circuits is distinctly defined with sharp leading and trailing edges.

The positive going rectangular pulse appearing at the plate of tube 111, the normally off tube of the one-shot multivibrator, is the same as that which appeared at the plates of tubes 55, 56 and 57 in the previously described circuit and has a time width proportional to the rate of the watch being measured.

It should be noted that the effect produced here by the one-shot multi-vibrator is the same effect that would be produced by applying the voltage wane of condenser 106 to an amplifier of very high gain, which amplifier would then be more costly and complicated and which would be critical to regenerative effects. The high gain necessary to sharpen the edges of the wave of voltage from condenser 106 is here provided by the stable regenerative action of the multi-vibrator which is effective only during the brief intervals of time when the switching is actually taking place. This, then, provides a very effective simplication in circuitry.

This same positive pulse is applied directly, at a reduce voltage level, to the control grid of tube 105. Tube 105 acts as a cathode follower with its cathode circuit connected as a part of the grid return circuit for the thyratron tube 104. Thus, the cathode follower tube 105 provides an instantaneous grid bias for thyratron tube 104 in such manner that the potential of the control grid of the thyratron tube 104 is negative with respect to its cathode potential by more than a sufficient amount to prevent any watch tick or any extraneous signal from causing conduction in the thyratron tube. This is the condition prevailing immediately following the triggering action by the watch tick signal and which continues until the timing action is complete. When the multi-vibrator switches back to its idling condition, the positive pulse appearing at the plate of tube 111 causes the cathode follower tube 105 to raise the grid potential of the thyratron tube 104 to a value just less than that which produces conduction in thyratron tube 104, so that the next watch tick may cause a repetition of the above cycle of events. Note that prior to the incidence of any watch tick, such as after standing with no watch in the holder, the thyratron tube is held in a condition ready for triggering and does not have the high negative grid bias due to the subtracting action since the plate of the normally off tube 111 will be at the full $+Br$ potential.

While I have described a certain specific embodiment of the principle of my invention, herein, it will be understood that modification may be made without departing from the principles of the invention; and, further, that there exist other major fields of measurement which this invention is readily suited to accommodate. One such, in particular is the measurement of frequency with the accuracy required in present day commercial radio broadcasting, including frequency modulated equipment and television equipment and to do this with an ease simplicity not presently known and available to the art. I do therefore wish to be included as a portion of this patent, the exclusive use of the shaper circuits and of the isolator-subtractor circuits but, I do not wish to be limited to the precise form and construction disclosed.

I do desire, therefore, to secure and have protected by Letters Patent all forms and modifications of my invention that come within the scope of the appended claims.

I claim:

1. In a circuit for subtracting the time of duration of a slaved pulse from the time between successive occurrences of a predetermined number of the periodic events, a source of slaved pulses having a triggering element, an amplifier stage tube having a control grid and cathode coupled to the source of the said periodic event and having an anode coupled to the triggering element of the source of said slaved pulse and having cathode biasing means to reduce the effective anode supply potential, control grid biasing means normally biasing said tube to cutoff thereby to prevent flow of anode current during absence of signal from the source of the periodic event, a control stage tube having a control grid and cathode and an anode connected directly to the anode of said amplifier tube, means normally biasing the control tube to cutoff thereby to prevent flow of anode current when said slaved pulse is not being generated, means for supplying the slaved pulses to the grid of the control tube to effect anode current flow in said control tube, and the lowering of the potential of the anodes of both the amplifier stage tube and the control stage tube to a potential lower than the cathode potential of said amplifier stage tube during the duration time of the said slaved pulse.

2. In a circuit for subtracting a constant time from the time between successive occurrences of a predetermined number of periodic events, means for producing a constant time pulse including a gas tube of the control grid type having biasing means to prevent conduction of anode current and a control grid connected to a source of periodic events, the arrangement being such that a signal from the source of periodic events will cause conduction in said gas tube, said gas tube having an anode connected by resistive means to a source of steady potential, and a condenser connected between the anode to cathode circuit so as to be discharged when the tube is rendered conductive, the effective combined discharging and recharging time of the condenser and resistance and gas tube being constant and less than the time between successive occurrences of the periodic events, amplifier means coupled to and supplied with the voltage variations across the said condenser for producing output voltage variations in pulse form corresponding in time to the variations at the rate of occurrence of said predetermined number of events, a cathode follower tube having a control grid coupled to the amplifier means to receive output pulses from the amplifier means, said follower tube having an anode connected directly to a source of steady potential and a cathode output circuit so arranged to reproduce the amplifier output pulses, and means coupling said cathode to the control grid biasing means of the gas tube, to increase the negative grid to cathode bias of the gas tube during the amplifier output pulse, to effectively prevent signals from the source of periodic events from causing conduction in the gas tube.

3. In apparatus for measuring the repetition rate of cyclic phenomena, means for producing a pulse of constant time duration for a cycle comprising a predetermined number of events, and an electron valve circuit for obtaining the difference between said constant time and the duration of said cycle in the form of a control pulse having a duration proportional to said difference, said constant time duration being slightly less than the length of time forming a cycle of said cyclic phenomena whereby the duration of the control pulse is varied over a relatively large range of values in response to small variations in the length of said cycle.

4. Apparatus for measuring the repetition rate of cyclic phenomena including, means for producing a first pulse of constant time duration closely approximating the time of a cycle comprising a predetermined number of events, an electron valve circuit coupled to said first mentioned means and the source of phenomena for producing a resultant pulse having a duration equal to the difference in duration of said first pulse and a cycle, and means coupled to said last mentioned means for converting said resultant pulse into a voltage of measurable magnitude.

5. In combination, means coupled to a source of cyclic phenomena for producing a signal at the beginning of a cycle comprising a predetermined number of events, means coupled to said signal producing means for producing another signal of constant duration, an electron valve circuit coupled to said last mentioned means for supplying a separate and distinct pulse having a duration equal to the time between the end of said other signal and the beginning of a succeeding cycle, and indicating means coupled to said last mentioned means.

6. Apparatus for producing an indication of the time between a fixed time interval and the duration of a cycle comprising a predetermined number of events of a cyclic phenomenon, including in combination, charge storing means, means responsive to the occurrence of a phenomenon for producing a first pulse having constant time of duration corresponding to the fixed time interval, means for producing a separate and distinct second pulse having a duration equal to the difference between said first pulse and said cycle, and control means coupled to said last mentioned means and to said charge storing means for varying the charge on said charge storing means in accordance with the duration of said second pulse.

7. Apparatus of the character described, including in combination, means responsive to the occurrence of a cyclically recurring phenomena comprising a predetermined number of events for producing, in synchronism with the phenomena, a series of first pulses and a series of second pulses having constant time of duration, said constant time of duration being slightly less than the length of time forming a cycle of said recurring phenomena; means coupled to said last mentioned means for producing a series of resultant pulses having a duration corresponding to the difference in duration of the cycles forming the phenomena and the second pulses; the durations of said resultant pulses varying over a large range of values in response to relatively small variations in the length of time forming cycles of said recuring phenomena due to the subtraction of a large proportion of the time forming said cycles; electric charge storing means; and means supplied with said resultant pulses and coupled to said charge storing means for varying the charge on said charge storing means proportionately to the duration of said resultant pulses.

8. Apparatus of the character described, including in combination, means responsive to the occurrence of a cyclically recurring phenomena for producing, in synchronism with the phenomena, a series of first pulses and a series of second pulses having constant time of duration, said constant time of duration being slightly less than the length of time forming a cycle of said recurring phenomena; means coupled to said last mentioned means for producing a series of resultant pulses corresponding to the difference in duration of the cycles forming the phenomena and the second pulses; electric charge storing means; and means supplied with said resultant pulses and coupled to said charge storing means for cyclically charging said charge storing means in accordance with said resultant pulses, the variations in the resultant pulses occurring over a large range of values in response to relatively small variations in the length of time forming said cycles of recurring phenomena due to the subtraction of a major portion of the time forming each of said cycles.

9. Apparatus of the character described, including in combination, pulse producing means including a normally nonconductive electron tube circuit having a plate and a control element coupled to a source of cyclic phenomena, resistance means connecting said plate to a source of voltage, said tube circuit being arranged to be rendered conductive upon occurrence of a cycle comprising a predetermined number of events of the phenomena, constant time duration pulse producing means including a plurality of serially acting one-shot multivibrator means, at least one of which is adjustable to regulate the duration of said pulse, means coupling said multi-vibrator means to the plate of said tube circuit and arranged to initiate operation of said multi-vibrator means upon production of a pulse, other normally nonconductive electron tube circuits having control elements and having their plates connected to said first mentioned plate, means coupling said constant time duration pulse producing means to the last mentioned control elements to render their circuits conductive for the duration of said pulse, and an output circuit connected to said plates.

10. Apparatus of the character described, including in combination pulse producing means including a normally nonconductive electron tube circuit having a plate, a cathode, and a control element coupled to a source of cyclic phenomena, resistance means connecting said plate to a source of voltage, said cathode being at a potential such that the circuit is rendered conductive upon occurrence of a cycle comprising a predetermined number of events of the phenomena, constant time duration pulse producing means including one-shot multi-vibrator means, means coupling said multi-vibrator means to the plate of said tube circuit and arranged to initiate operation of said multi-vibrator means upon production of a pulse, other normally nonconductive electron tube circuit means having control means and having plate means connected to said first mentioned plate, means coupling said constant time duration pulse producing means to the last mentioned control means to render the circuit means conductive for the duration of said pulse, and an output circuit connected to said plates, said resistance means being of such magnitude that the first mentioned tube circuit is rendered nonconductive by the reduction of its plate voltage when said second mentioned tube circuit means is rendered conductive.

11. Apparatus of the character described, including in combination, pulse producing means including an electron tube circuit having a control element coupled to a source of cyclic phenomena, said tube being arranged to be rendered conductive upon occurrence of a cycle of the phenomena comprising a predetermined number of events, constant time duration pulse producing means including one-shot multi-vibrator means, means coupling said multi-vibrator means to the plate of said tube circuit and arranged to initiate operation of said multi-vibrator means upon production of a pulse, other normally nonconductive electron tube circuit means having control element means, means coupling said last mentioned control means to said constant time duration pulse producing means to render its associated circuit means conductive for the duration of said pulse, and an output circuit connected to said plates.

12. Apparatus of the character described for determining the frequency of cyclic phenomena, including in combination, means including amplifying means adapted to be coupled to the source of phenomena for producing a triggering signal in synchronism with the beginning of each cycle comprising a predetermined number of events, pulse producing means including a normally nonconductive electron tube circuit having a plate and a control element coupled to said amplifying means, resistance means connecting said plate to a source of potential, said tube being arranged to be rendered conductive to produce a pulse upon occurrence of the triggering signals, constant time duration pulse producing means including a plurality of serially acting one-shot multi-vibrator means, at least one of which is adjustable to regulate the duration of said pulse, means coupling said multi-vibrator means to the plate of said tube circuit and arranged to initiate operation of said multi-vibrator means upon production of a pulse, other normally nonconductive electron tube circuits having control elements and having their plates connected to said first mentioned plate, means coupling said last mentioned control elements to respective ones of said multi-vibrator means to render said circuits serially conductive for the duration of said pulse, an output circuit connected to said plates, charge storing means, means including charge varying means controlled in response to the duration of said pulses coupling said output circuit to said charge storing means, filter means coupled to said charge storing means, and indicating means coupled to said filter means.

13. Apparatus of the character described for determining the frequency of cyclic phenomena, including in combination, means including amplifying means coupled to the source of phenomena for producing a triggering signal in synchronism with the beginning of each cycle comprising a predetermined number of events, a gas tube of the control grid type having biasing means to prevent conduction of anode current, having a control grid coupled to said first mentioned means and supplied with said triggering signals so that a signal will cause conduction in said gas tube, and having an anode connected by resistive means to a source of steady potential, a condenser connected between the anode to cathode circuit of said gas tube and adapted to be discharged therethrough, the effective combined discharging and recharging time of the condenser and resistance and gas tube being constant and less than the duration of a cycle of the phenomena, means including amplifier means coupled to and supplied with the voltage variations across the said condenser for producing output voltage variations in pulse form, a cathode follower tube having a control grid coupled to the amplifier means to receive output pulses from the amplifier means, having an anode connected directly to a source of steady potential, and having a cathode output circuit so arranged as to reproduce the amplifier output pulses, means coupling said cathode to the control grid of the gas tube, to increase the negative grid to cathode bias of the gas tube during the amplifier output pulse, to effectively prevent signals from the source of periodic events from causing conduction in the gas tube, charge storing means, means coupled to the amplifier means and supplied with said output pulses for varying the charge of said storing means in response to the duration of said output pulses, filter means coupled to said storage means, and indicating means coupled to said filter means.

14. In an apparatus for measuring the repetition rate of cyclic phenomena including a predetermined number of events, means for producing a pulse of constant time duration for each cycle of said phenomena, said constant time being slightly less than the length of time forming a cycle of said phenomena, an electron valve circuit coupled to the source of phenomena and said last mentioned means for subtracting said constant time from the length of time forming one of said cycles to produce a discrete control signal proportional to the difference between the length of one of said cycles and said constant time, said control signal varying over a large range of values in response to a small variation in the length of time forming one of said cycles due to the subtraction of the major portion of the chronometric length of said cycle, and means for producing an indication in accordance with said control signal.

15. Apparatus for measuring the repetition rate of cyclic phenomena produced by a source of phenomena, including in combination, means coupled to the source for producing control pulses of constant time duration closely approximating the time of the cycle, means coupled to the source and first mentioned means for producing resultant control pulses having a short time of duration proportional to the difference between said constant time and the time of the cycle, said resultant control pulses varying over a large range of values in response to a small variation in the length of time forming one of said cycles due to the subtraction of the major portion of the chronometric length of said cycle, and a utilization circuit coupled to said last mentioned means and supplied with said resultant control pulses.

16. In apparatus for measuring the repetition rate of cyclic phenomena including a predetermined number of events, means coupled to the source of phenomena for producing a signal of constant time duration; and means coupled to the source of phenomena and said constant time signal producing means for providing a control signal having a chronometric length proportional to the difference between the duration of said constant time signal and the duration of the phenomena, said control signal also being characterized by a first variation in magnitude from a predetermined value, a continuous intermediate portion displaced in magnitude from said value, and a second variation in magnitude back to said predetermined value.

17. In apparatus for measuring the repetition rate of cyclic phenomena including a predetermined number of events, means coupled to the source of phenomena for producing a signal of constant time duration; means coupled to the source of phenomena and said constant time signal producing means for providing a control signal having a chronometric length proportional to the difference between the duration of said constant time signal and the duration of the phenomena, said control signal also being characterized by a first variation in magnitude from a predetermined value, a continuous intermediate portion displaced in magnitude from said value, and a second variation in magnitude back to said predetermined value; and a utilization circuit operated in accordance with said control signal to produce an indication of the time interval defined by said first and second variations.

References Cited in the file of this patent

UNITED STATES PATENTS

| Number | Name | Date |
|---|---|---|
| 2,144,873 | Dimond | Jan. 24, 1939 |
| 2,266,526 | White | Dec. 16, 1941 |
| 2,282,895 | Shepard, Jr. | May 12, 1942 |
| 2,287,043 | Kohlahagen | June 23, 1942 |
| 2,317,202 | Kohlhagen | Apr. 20, 1943 |
| 2,330,416 | Gibbs | Sept. 28, 1943 |
| 2,332,300 | Cook | Oct. 19, 1943 |
| 2,377,757 | Clark | June 5, 1945 |
| 2,492,617 | Boland | Dec. 27, 1949 |
| 2,544,482 | Barnes | Mar. 6, 1951 |